US010546248B2

(12) United States Patent
Johnson et al.

(10) Patent No.: US 10,546,248 B2
(45) Date of Patent: *Jan. 28, 2020

(54) SYSTEM AND METHOD FOR DEFINING AND CALIBRATING A SEQUENTIAL DECISION PROBLEM USING HISTORICAL DATA

(71) Applicant: Supported Intelligence, LLC, East Lansing, MI (US)

(72) Inventors: Jeffrey P Johnson, East Lansing, MI (US); Neal P Anderson, East Lansing, MI (US)

(73) Assignee: Supported Intelligence, LLC, East Lansing, MI (US)

(*) Notice: Subject to any disclaimer, the term of this patent is extended or adjusted under 35 U.S.C. 154(b) by 853 days.

This patent is subject to a terminal disclaimer.

(21) Appl. No.: 14/982,382

(22) Filed: Dec. 29, 2015

(65) Prior Publication Data

US 2016/0196492 A1 Jul. 7, 2016

Related U.S. Application Data

(60) Provisional application No. 62/098,410, filed on Dec. 31, 2014.

(51) Int. Cl.
*G06N 20/00* (2019.01)

(52) U.S. Cl.
CPC .................................. *G06N 20/00* (2019.01)

(58) Field of Classification Search
CPC ...... G06N 99/005; G06N 5/045; G06N 20/00; G06Q 10/0637
See application file for complete search history.

(56) References Cited

U.S. PATENT DOCUMENTS

| | | | | |
|---|---|---|---|---|
| 2005/0041744 A1* | 2/2005 | Verhaegh | .............. | G06F 9/4887 375/240.26 |
| 2010/0082513 A1* | 4/2010 | Liu | ..................... | H04L 63/1458 706/46 |
| 2011/0302002 A1* | 12/2011 | Dance | ................ | G06Q 30/0201 705/7.35 |
| 2012/0030137 A1* | 2/2012 | Garcke | .................. | G06Q 40/04 705/36 R |
| 2013/0080377 A1* | 3/2013 | Newnham | ............ | G06N 99/005 706/52 |

* cited by examiner

*Primary Examiner* — Robert A Cassity
*Assistant Examiner* — Robert Bejcek, II

(57) ABSTRACT

A system and method for defining and calibrating the inputs to a sequential decision problem using historical data, where the user provides historical data and the system and method forms the historical data (along with other inputs) into at least one of the states, actions, rewards or transitions used in composing and solving the sequential decision problem.

20 Claims, 11 Drawing Sheets

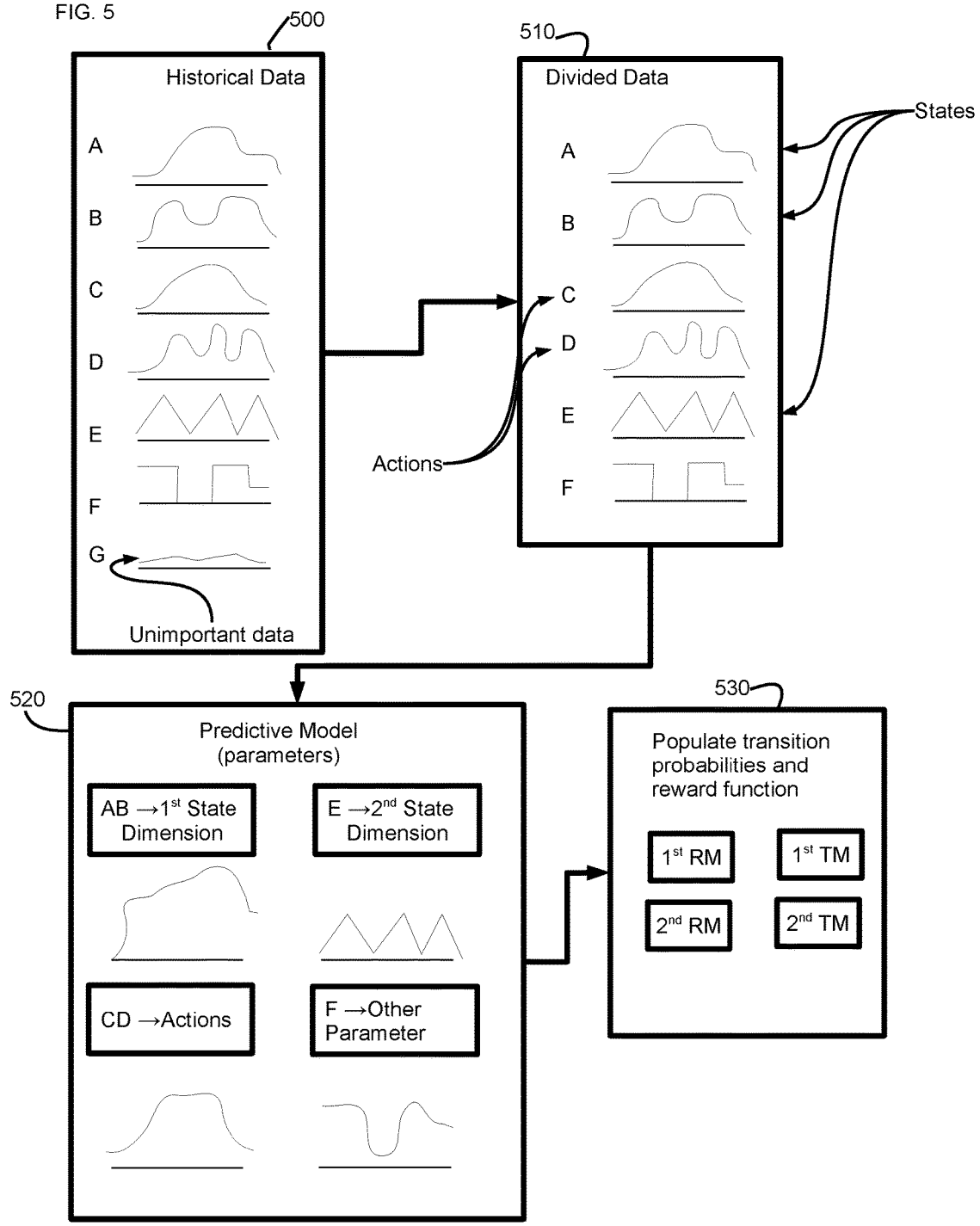

FIG. 6    Historical Data for a State Dimension
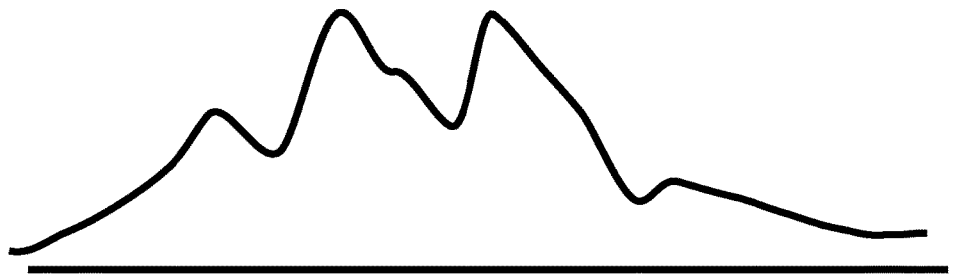
After the Historical Data has been categorized, predictive models created and the data has been calibrated.
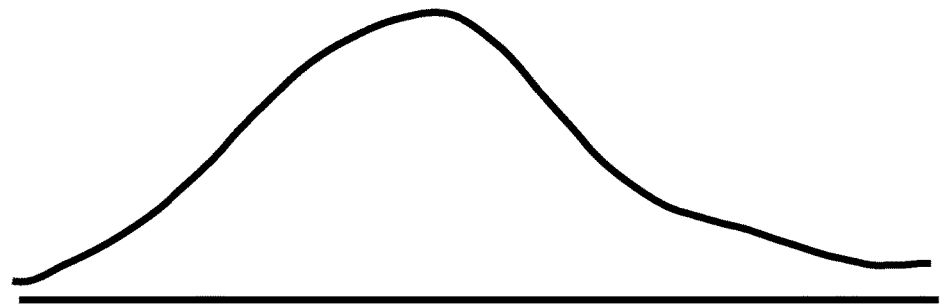
Binned into 5 discrete elements
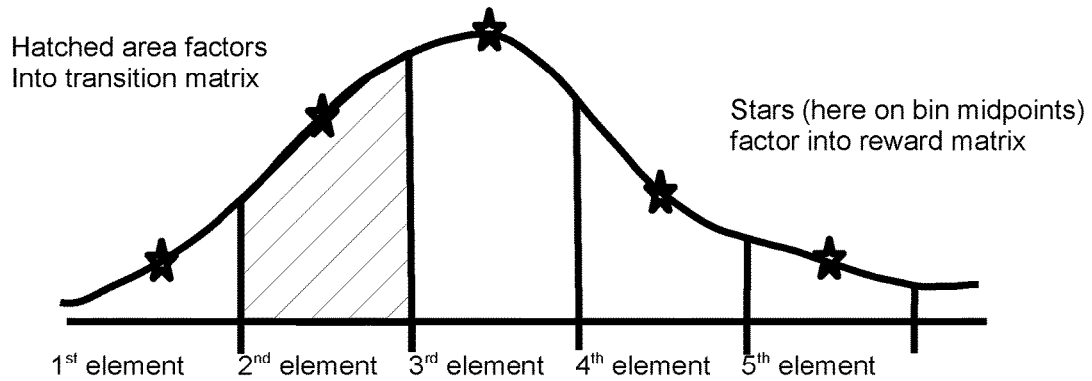
Hatched area factors Into transition matrix
Stars (here on bin midpoints) factor into reward matrix
1st element    2nd element    3rd element    4th element    5th element

SYSTEM AND METHOD FOR DEFINING AND CALIBRATING A SEQUENTIAL DECISION PROBLEM USING HISTORICAL DATA

RELATED APPLICATIONS

This patent application claims priority to provisional patent application 62/098,410.

BACKGROUND OF THE INVENTION

Field of the Invention

A "sequential decision problem" is a problem that involves multiple periods of time, where the subject of the problem has more than one possible course of action, receives information sequentially over time, and must make a decision at each point in time.

In general, sequential decision problems contemplate a subject capable of making a sequence of decisions (each causing some "action" to take place) as the subject faces a series of possible conditions (or "states"). The actions of the subject, together with any random (stochastic or uncertain) events, result in the subject of the problem receiving a reward (or penalty) in the current time period, and then transitioning to another state. That subsequent state is the setting for the same or a similar problem in the following time period.

Sequential decision problems represent a large number of decision problems faced by individuals, families, investors, business managers, governments, and other organizations. In many such problems there is difficulty in both defining and calibrating the inputs to, and solving the decision problem.

Description of Related Art

When analyzing these problems the term "calibrate" means to use statistical methods to estimate parameters. Calibration is thus the use of statistical methods to estimate parameters. Furthermore, with regards to a sequential decision problem, the term "define" means using statistical techniques to determine the state space, action space, or time index of a sequential decision problem. Definition is thus the use of statistical techniques to determine the state space, action space, or time index.

Current systems and methods of calibrating or defining the inputs to the decision problem rely heavily on the user's ability to apply the user's own experience to define the inputs in a "heuristic" fashion. The user must define the possible actions, states (with rewards corresponding to each state-action pair), and the transition probabilities between states when the actions are taken. However, this approach may fail in many situations, such as:

Systems where the number of states or actions becomes large

The state space or action space is not immediately apparent, or the user wishes to use a rigorous method to choose between possible state or action spaces The user wishes to inform the choice of state space, action space, transition matrix, or reward matrix from data describing the behavior of the system Cases where the user wishes to avoid bias when determining the inputs.

When any of the above cases occur, constructing the state and action spaces and or the reward and transition matrices becomes a tedious and difficult task.

SUMMARY OF THE INVENTION

The present invention relates to a system and method for defining and calibrating the inputs to a sequential decision problem using historical data.

In a disclosed embodiment a computer-aided system for defining and calibrating the inputs to a sequential decision problem using historical data is provided. The computer system includes a user input device, a user output device and a processor programmed to evaluate decision problems available to a user, the processor facilitating input of a historical data set from the decision maker via the user input device. The processor further creating a decision problem to be solved, the decision problem defined by parameters generated using statistical techniques on the historical data set, the parameters including: (i) an action set, the action set has elements representing actions available to the subject and the costs of performing the actions, (ii) at least one state dimension representing conditions relevant to the decision problem, (iii) a reward set representing rewards received by the user when transitioning between states for actions in the action set, (iv) a transition matrix containing the probability of moving between the states for actions in the action set, (v) a time index and a discount factor, the time index containing decision points available to the user where the user selects an action from the action set, and the discount factor representing the subject's preference for rewards relative to time. The processor combines the reward set with the action costs to form a reward matrix and the programmed processor combines the transition matrices with the action set to form a total transition matrix. The processor forms a functional equation from the state dimensions, the reward matrix, the total transition matrix, and all remaining parameters. The processor evaluates the functional equation, including error-checking and validating the parameters, performing a convergence check to ensure that the functional equation will be solvable, and solving the functional equation. The processor generates an optimal policy by using the solved functional equation to find, for every point in the decision index, the overall value-maximizing action, the set of decisions made at each point in the decision index forming the optimal policy. Finally the processor outputs the optimal policy to the user through the user output device.

In another disclosed embodiment there is a computer implemented method for assisting a user in making a decision. One step comprises of providing a computer system having a user input device, a user output device and a processor programmed with instructions to evaluate decision problems available to the user, the instructions programming the processor. Another step comprises of using the computer system to facilitate input of a historical data set from the decision maker via the user input device. Still another step defines a decision problem to be solved, the decision problem defined by parameters generated using statistical techniques on the historical data set, the parameters including (i) an action set, the action set has elements representing actions available to the subject and the costs of performing the actions, (ii) at least one state dimension representing conditions relevant to the decision problem, (iii) a reward set representing rewards received by the user when transitioning between states for actions in the action set, (iv) a transition matrix containing the probability of moving between the states for actions in the action set, (v) a time index and a discount factor, the time index containing decision points available to the user where the user selects an action from the action set, and the discount factor representing the user's preference for rewards relative to time. A still further step combines the reward set with the action costs to form a reward matrix and combines the transition matrices with the action set to form a total transition matrix. In another step a functional equation is formed from the state dimensions, the reward matrix, the total transition matrix, and all remaining parameters. The functional equation is evaluated, including error-checking and validating the parameters, performing convergence checks to ensure that the functional equation will be solvable, and solving the functional equation. In another step an optimal policy is generated by using the solved functional equation to find, for every point in the decision index, the overall value-maximizing action, the set of decisions made at each point in the decision index forming the optimal policy, which is outputted to the user through the user output device.

BRIEF DESCRIPTION OF THE DRAWINGS

FIG. 5 is a block diagram showing an example of the system and method for defining and calibrating the inputs to a decision problem from historical data.

FIG. 6 is a chart showing an example of the system and method for defining and calibrating the inputs to a decision problem from historical data.

DETAILED DESCRIPTION OF THE INVENTION

Figure 1:
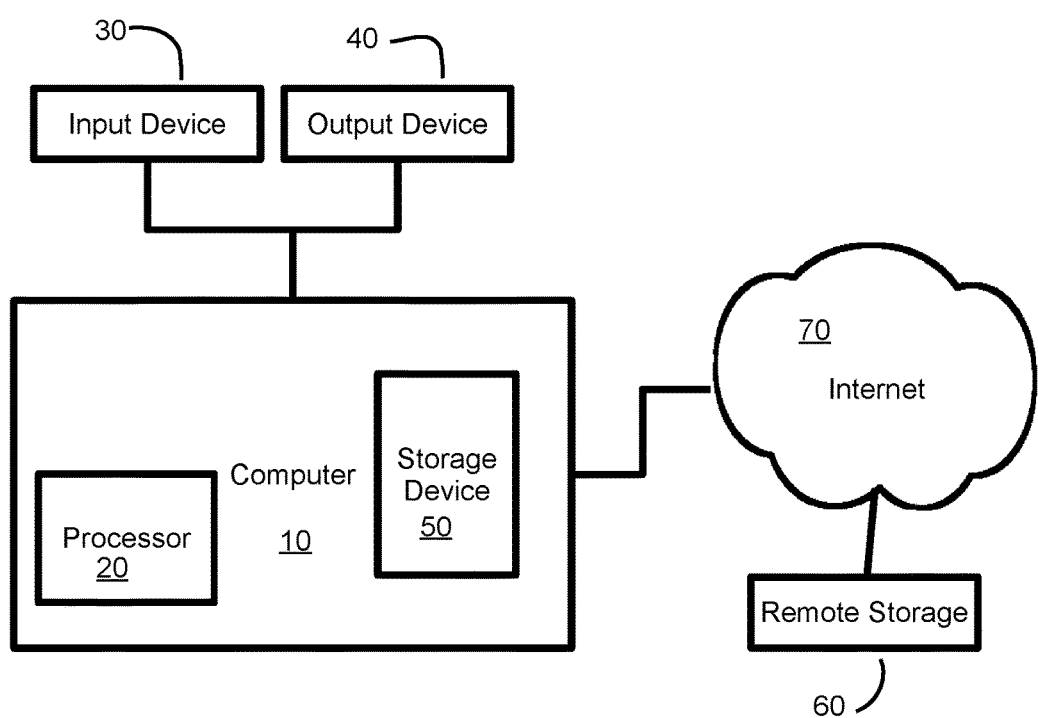
FIG. 1 is a block diagram of a computer system for defining and calibrating inputs to a sequential decision problem from historical data.

Transforming a user's historical data into the inputs for a sequential decision problem by defining and calibrating the historical data allows the user to remove at least some bias from the inputs into the decision problem and to avoid the tedious work or impracticable (for large problems) work in creating the inputs. The ability to automatically define and calibrate inputs to a decision problem has the potential to improve decision making in many fields, particularly fields where decision problems have exceedingly large state spaces, action sets, or other unwieldy inputs. For example:

(1) A problem has a large state space. The state space, and the corresponding transition space and reward space could have hundreds, thousands or more elements; a user may not have the time to decide how many states or actions to include or the ability to distinguish between meaningfully different states and actions. Specifically, the user could be a gas station attempting to analyze a pricing problem taking into account competitors, input prices, discount programs and time of day. The number of possible states will be far larger than is practical for the user to meaningfully consider coding each state. Additionally, the probabilities of transitioning between the states will be difficult if not impossible for a user to estimate other than by guessing or relying on instinct, a decision making process little better than normal. This system and method will allow the gas station owner to use historical data, likely already collected if not sorted into a useful form, to define, calibrate and solve a sequential decision problem.

(2) A store owner who has kept records of pricing, wholesale costs, employment expenses and other data in a variety of schemes and methods over the years. Now the store owner wishes to use this historical data to aid in deciding whether to expand the current store or create a second store at another location. However, the store owner is unwilling or incapable of efficiently sorting through the historical data and parsing it into the inputs of a sequential decision problem. This system and method will allow the store owner to still receive decision making advice without having to laboriously parse the historical data into inputs, code the inputs and decide on transition probabilities.

(3) A user is operating under time constraints, and while capable of turning a limited historical data set into the inputs for a sequential decision problem, would prefer to spend time more efficiently on other tasks. This system and method allows the user to still receive decision making advice while reducing the time needed to craft the inputs to the decision problem.

(4) A campaign manager would like to more efficiently allocate limited money between different forms of advertising, but is struggling to honestly and accurately asses the transition probabilities and the rewards. This system and method allows the manager to use historical data mixed with information about the current situation to receive decision making advice without having to rely on the manager's own judgment when defining the inputs to the decision problem.

The system and method may be implemented in a variety of computer systems. FIG. 1 shows an exemplary computer system. The computer system has a computer 10, with a processor 20, an input device 30, an output device 40, a storage device 50 and the computer system is capable of executing computer software that programs the computer to define and calibrate inputs based upon historical data provided by the user to evaluate sequential decision problems.

The computer software may be stored on a hard drive (shown generally as storage device 50) or other local or networked storage devices. Additionally, parts of the computer system may be located remotely. For example, the computer software for programming the computing system may be remotely stored in remote storage device 60 and accessed over a network 70. The network 70 may be a local network, a wide area network, a virtual private network, the internet or any combination of linked devices. For example, the computing system may be on a local network connected to the internet connected to another local network connected to the remote storage device 60.

The processor 20 is any computer processor capable of executing computer software. The processor 30 does not refer specifically to a central processing unit, but may also refer to combinations of central processing units and graphics processing units or other combinations of electronic devices capable of processing information according to instructions provided by computer software.

The input device 30 inputs information into the computer system from the user (not shown) or from other sources (such as over the network 70). The output device 40 outputs information from the computer system 10 to the user. The input device 30 and the output device 40 may be the same device. For example, a touchscreen monitor may be the input device 30 and the output device 40, as the touchscreen monitor is capable of displaying and receiving information. The input device 30 may be a mouse, a keyboard, voice control or gesture recognition or any other device capable of inputting information to the computer system. The output device 40 may be a computer screen, phone screen, monitor, television, printer, or any other device capable of outputting information from the computer system.

Figure 2:
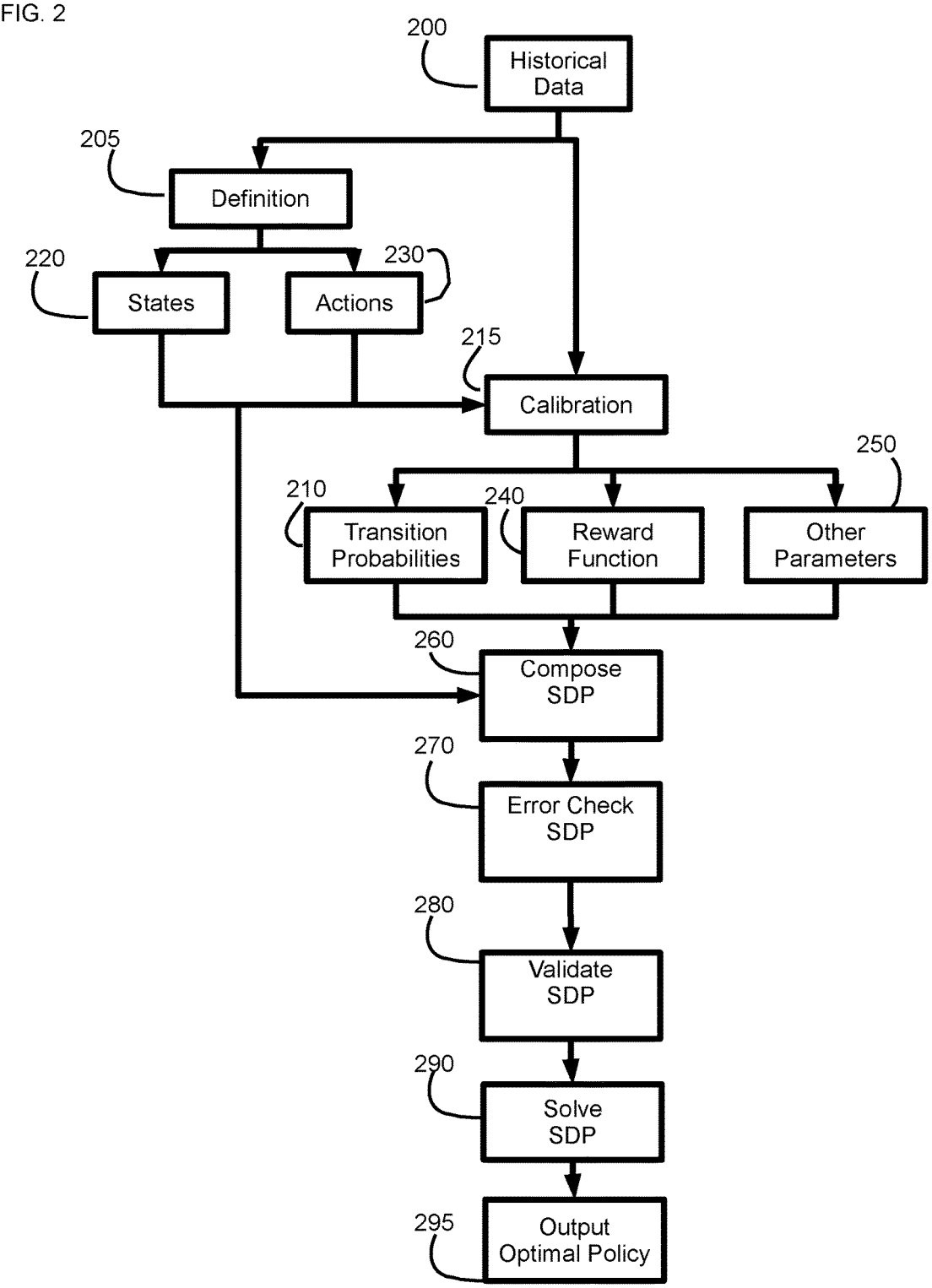
FIG. 2 is a block diagram of an embodiment of the system and method for defining and calibrating the inputs to a decision problem from historical data.

FIG. 2 is a block diagram showing the input of historical data to the computer system. The user has historical data 200, the system and method takes the historical data 200 and uses statistical techniques to define and calibrate parameters from the historical data 200. The parameters, including transition probabilities 210, states 220, actions 230, reward function 240 and other parameters 250, define a sequential decision problem.kes the parameters and composes a sequential decision problem in block 260, then in blocks 270 and 280 error checks and validates the parameters to ensure that the parameters define a solvable sequential decision problem. In blocks 290 and 295 the system and method solves the sequential decision problem and outputs the solution, an optimal policy, to the user.

The historical data 200 may be any data provided by the user. The historical data 200 should be relevant to the user's experience so that statistical analysis of the historical data 200 may reveal relationships between aspects of the historical data 200 relevant to a situation that the user is attempting to analyze. The term "user" refers to both the user of the system and method and the subject of the decision problem. In practice the user of the system and method and the subject of the decision problem may be separate entities. For example, the system and method is used and performed by a business consultant (the user) using historical data provided by a business owner (the subject). The historical data 200 may be sales records, customer information, pricing data or any other information the user knows, or believes to be, relevant to the situation the user is attempting to analyze. Additionally, the historical data 200 may be or include irrelevant information. Statistical analysis is performed to sort the relevant information from the irrelevant information to minimize computational requirements and provide decision making advice that will most accurately guide the user.

The transition probabilities 210 represent the probabilities of moving between states in the states 220 when selecting an action from the actions 230. For example, the subject is considering inventory levels when setting prices. If the subject raises prices inventory could go down, which likely has a low probability of occurring (though it is possible: for example a luxury good or a good otherwise in high demand). Inventory could also go up or stay the same. The transitions probabilities 210 in this example would represent the probabilistic outcomes of price changes on inventory levels.

The states 220 is the set of possible situations in which the subject must make a decision. Each state describes the value of one or more state dimensions, which represent the conditions the subject would like to consider when solving the decision problem to maximize the expected future value. For example, the user of the method may like the subject to consider a state dimension representing the amount of inventory on hand, and another representing the price of their product. The states 220 would then contain all relevant combinations of inventory and price The actions 230 are the set of actions that the user selects from, at each point in the time index (contained in other parameters 250). For example, a user may be able to raise, lower or maintain the price of a good once a month. Actions 230 also have action costs, the cost to the user of performing an action from the actions 230. At each point in the time index the user is in a state (one of the states 220) and selects an action (one of the actions 230), the user receives a reward determined by the rewards 230 and the action costs from the action set 210. The action cost may be an arithmetic, multiplicative, or other function of variables associated with the state and action vectors and the structure of the problem.

The reward function 240 is the set of rewards received by the subject when transitioning between states 220 at a point in the time index after having performed an action from the actions 230. For example, the subject chooses to raise the price of a good, the subject (according the probabilities in the transition probabilities 210) could transition to a state where the subject has lower inventory or higher inventory. When the subject transitions from one state to another state (which may be the same as the first state) the subject receives a reward according to the reward function 240.

The other parameters 250 includes a time index, a discount factor and in some embodiments may include constraints. The time index is a set of decision points—discrete moments in time—when the subject takes an action from the actions 230. For example, price could be changed monthly, daily or hourly. The discount factor takes into account both the risk of operating within the structure of the decision problem, and the time value of money, as well as potentially other subjective considerations related to the timing of rewards and actions. For example the discount factor may represent the subject's preference for immediate over delayed rewards or the subject's assessment of the underlying risk to the subject embedded in the decision problem. The use of such a factor is sometimes considered as converting future potential rewards to their "present value" rewards.

In block 205 the computer system uses statistical methods, applied to the historical data 200, to determine the size and elements of the states 220 and actions 230. The computer system may use any of a number of appropriate statistical methods to complete this task, including k-means, k nearest neighbor, or hierarchical clustering or a Bayes or Naïve-Bayes classifier.

In block 215 the computer system uses statistical methods—applied to the historical data 200, and the states 220 and actions 230—to estimate parameters and values in the transition probabilities 210, reward function 240, and other parameters 250. The computer system may use any of a number of appropriate statistical methods to complete this task, including linear, log-linear, or logistic regression, or simple averaging or counting (frequentist probability) techniques.

In block 260 the computer system (or more generally an "analysis engine") processes the defined and calibrated parameters to form a functional equation. The functional equation is an equation that may be solved to maximize the expected future value for a decision problem. The user may be prompted to select a solution technique, or a default solution technique can be set and used.

In blocks 270 and 280 the computer system error checks, validates and tests for convergence the functional equation formed in block 260 from the defined and calibrated parameters created from the historical data 200. The checks in blocks 270 and 280 examine the functional equation to ensure that the functional equation describes a decision problem solvable through one of the techniques described herein. These checks confirm that all necessary portions of the problem have been defined, either by default values or by the user, and that the values provided will not result in the computer entering an infinite loop during the solution process.

In blocks 290 and 295 the computer system solves and outputs the functional equation created in block 260 and checked in blocks 270 and 280. Different solution techniques may be used depending on the particular form of the functional equation. Some solution techniques include value function iteration (also known as successive approximations, over-relaxation, or pre-Jacobi iteration), policy iteration (also known as policy improvement), a root-finding algorithm, or other numeric solution techniques. The output is the optimal policy, a mapping of states to a recommended set of actions, created from the solution.

Figure 2A:
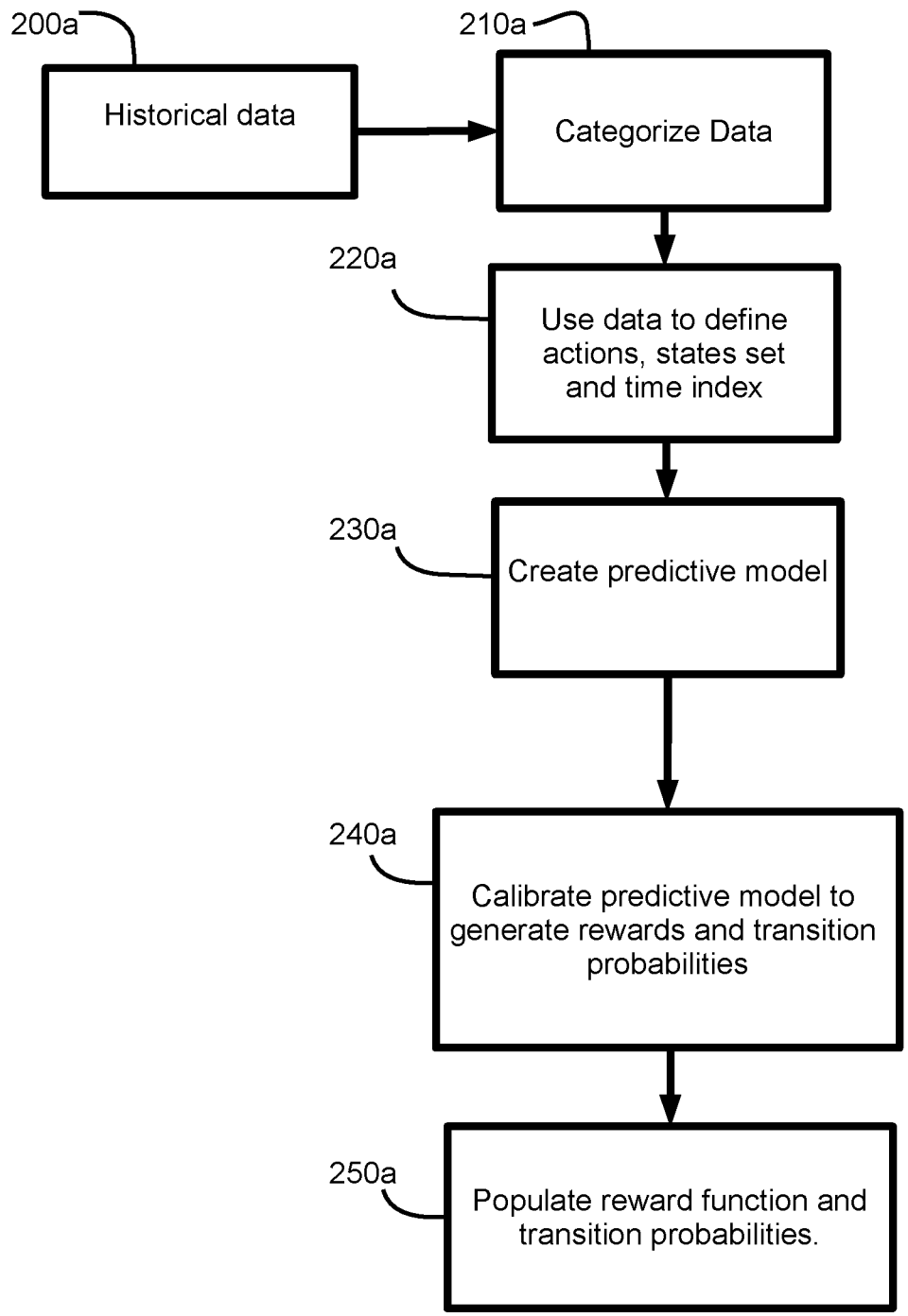
FIG. 2a is a flow chart of an embodiment of the system and method for defining and calibrating the inputs to a decision problem from historical data.

FIG. 2a is a flowchart showing the steps to take historical data and define and calibrate parameters for a decision problem from the historical data. More specifically, FIG. 2a is a breakdown of the steps involved before block 260 in FIG. 2. In step 200a the user collects and inputs historical data. This may include collecting or compiling data from business records, parsing the data into processable form or conducting studies on business conditions relevant to the user.

In step 210a the user, using a computer system as described in FIGS. 1 and 2 uses statistical techniques (such as k-means, k nearest neighbor, or hierarchical clustering, or a Bayes or naïve-Bayes classifier) to categorize the data. For example, pricing data might be categorized into one table while costs such as labor expenditures per month could be categorized into another table. Some data might have a different periodic structure, for example hourly prices but monthly labor expenditures and a binning method may have to be employed to arrive at a consistent time index.

In step 220a the categorized data is used to define the actions, the states, the time index and the discount factor. For example, the categorized data might be broken down into data controllable by the user and this data used to define the action set while periodic data may be used to define the time index. A wide array of data is usable in defining states, and various techniques may be used to determine which parts of the supplied historical data is relevant to outcomes experienced by the user. Relevant data may be used in defining states while irrelevant data may be discarded.

In step 230a the initial parameters and other remaining data from the historical data are analyzed and processed to form a predictive model, capable of approximating both a reward function and transition probabilities.

In step 240a the predictive model is fine-tuned to improve the accuracy of the predictive model.

In step 250a the reward function and the transition probabilities are created from the calibrated predictive model. This may be as simple as creating a few reward vectors and interpolating transition probabilities or more complicated when the reward function has multiple dependencies and the transition probabilities are highly state specific.

Figure 3:
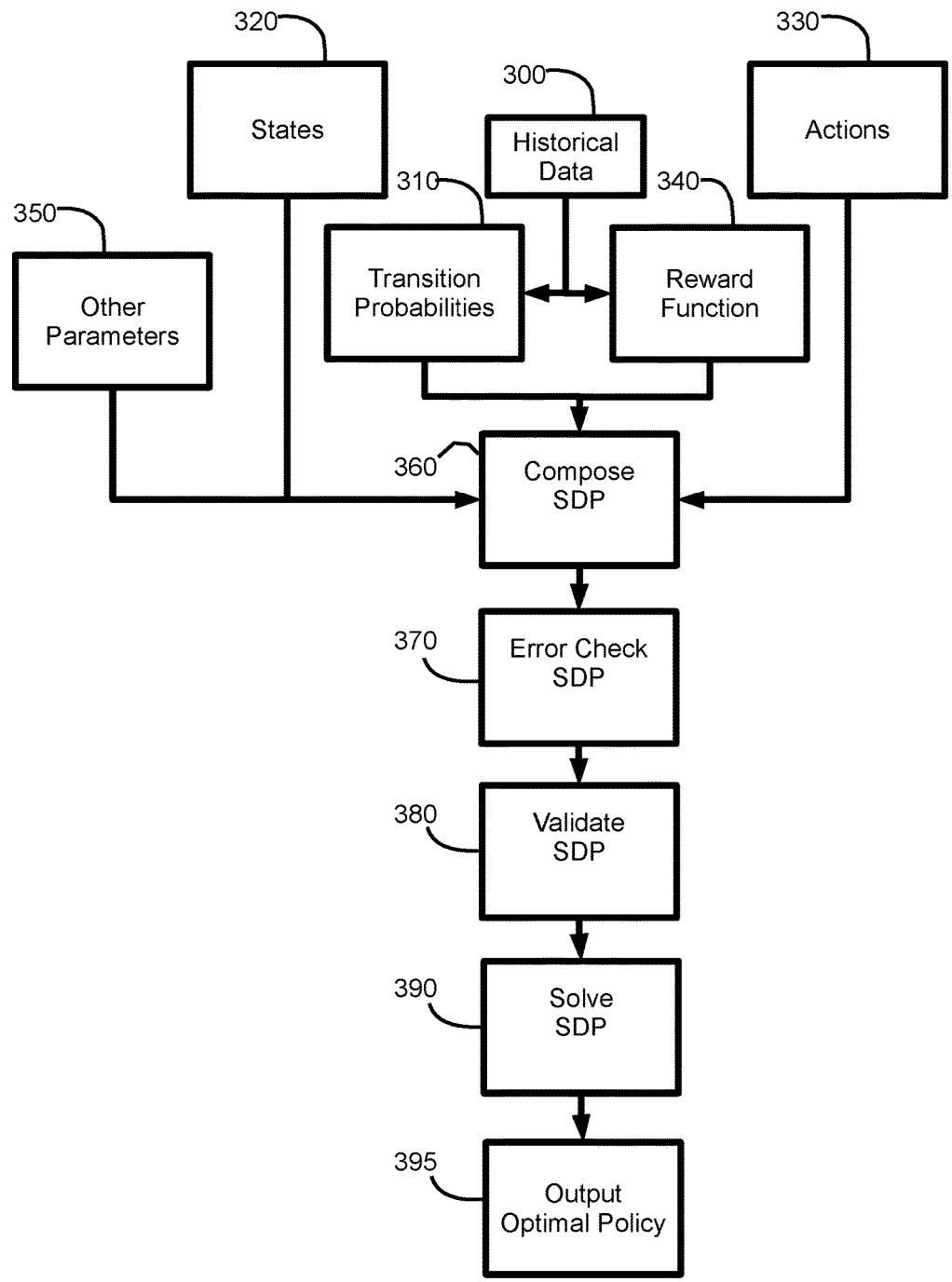
FIG. 3 is a block diagram of an embodiment where the user provides some inputs and historical data.

FIG. 3 shows an exemplary embodiment where the user provides some of the inputs to the decision problem and others are defined and calibrated from historical data. Historical data 300 is analogous to FIG. 2, however the computer system defines and calibrates only the transition probabilities 310 and the reward function 340 (also analogous to FIG. 2) from historical data 300. In this embodiment the user provides the states 320, the actions 330 and other parameters 350 analogous to those found by the computer system in FIG. 2. Blocks 360, 370, 380, 390 and 395 are likewise analogous to FIG. 2.

In FIG. 3 the user a priori has arrived at the states 320, actions 330 and other parameters 350, but does not have the transition probabilities 310 or the reward function 340. The system and method defines and calibrates the transition probabilities 310 and the reward function 340 from the historical data 300 freeing the user from having to estimate or otherwise arrive at the transition probabilities 310 and the reward function 340.

Figure 3A:
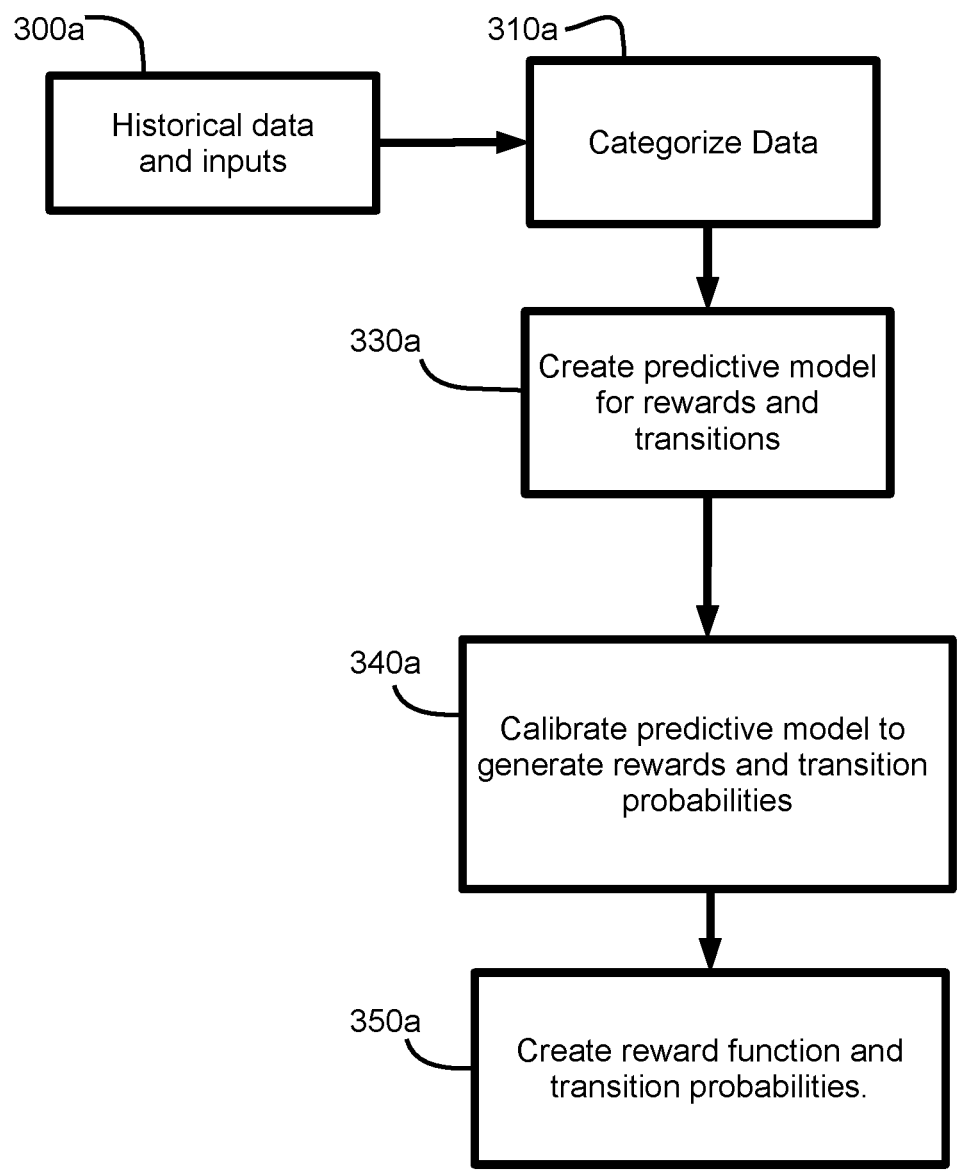
FIG. 3a is a flow chart of an embodiment of the system and method for defining and calibrating the inputs to a decision problem from historical data where states, actions and other parameters are provided by the user.

FIG. 3a is a flowchart showing the steps to take historical data and define and calibrate the inputs to a sequential decision problem where the user provides some of the inputs to the decision problem. More specifically, FIG. 3a is a breakdown of the steps involved before block 360 in FIG. 3 and is analogous to FIG. 2a. In step 300a the user inputs historical data and the states 320, the actions 330 and other parameters 350. This requires the user to define the states 320, the actions 330 and the other parameters 350. Step 310a is analogous to step 210a, however since the user has provided some inputs the computer system does not need to produce actions or states and may only categorize data statistically relevant to transitions and rewards.

In step 330a the provided information and the historical data are analyzed and processed to form a predictive model, capable of approximating both a reward function and transition probabilities. In step 340a the predictive model is fine-tuned to improve the accuracy of the predictive model. In step 350a the reward function and the transition probabilities are created from the tuned predictive model.

Figure 4:
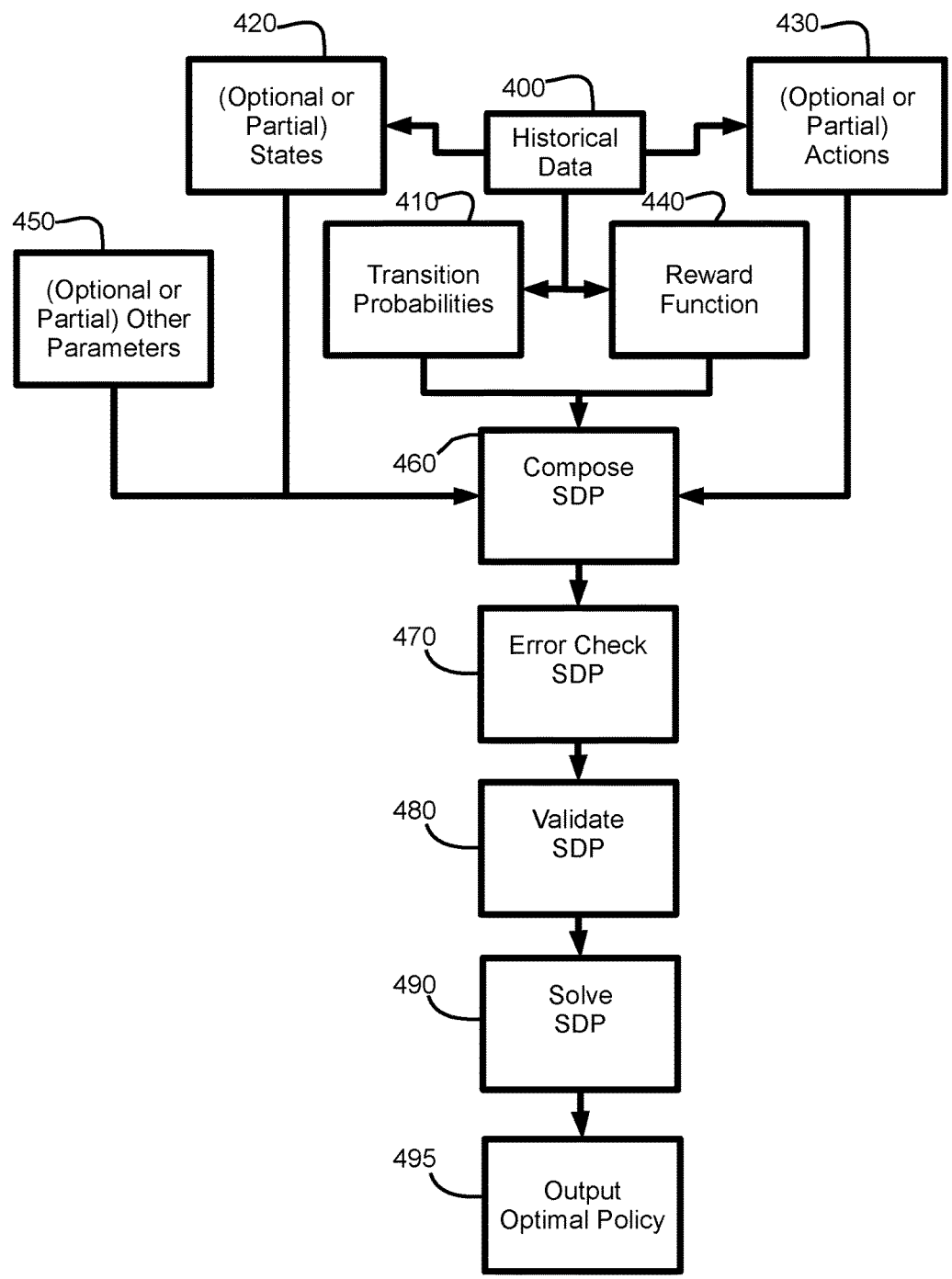
FIG. 4 is a block diagram of an embodiment where the user provides some incomplete inputs and historical data.

FIG. 4 shows an exemplary embodiment where the user provides historical data and at least parts of the inputs to the decision problem. Historical data 400 is analogous to FIG. 2, however the computer system defines and calibrates all of the parameters used to compose the decision problem in block 460. In this embodiment the user may provide some of the states for the states 420, some of the the actions (or action costs) for the actions 430 and some of the other parameters 450. However, if the user does not provide information or provides incomplete information the computer system will fill in not provided information when the computer system defines and calibrates the parameters from the historical data 400. Additionally, the user may allow the computer system to modify the provided information based on the analyzed historical data during calibration. If the user chooses to prevent modification of provided information (or sets limits or other rules on the modification of provided information) the provided information is called a constraint. Blocks 460, 470, 480, 490 and 495 are analogous to FIG. 2.

In FIG. 4 the user provides historical data and other information that fills in some of the inputs to a sequential decision problem, but is incomplete or the user provides complete information (i.e. information that defines a sequential decision problem) but would like the computer system to calibrate the information to increase the accuracy of the resulting decision making advice. FIG. 4 shows the computer system defining unprovided inputs, calibrating all (or user selectably some) of the parameters and then moving to provide decision making advice relevant to the user.

Figure 4A:
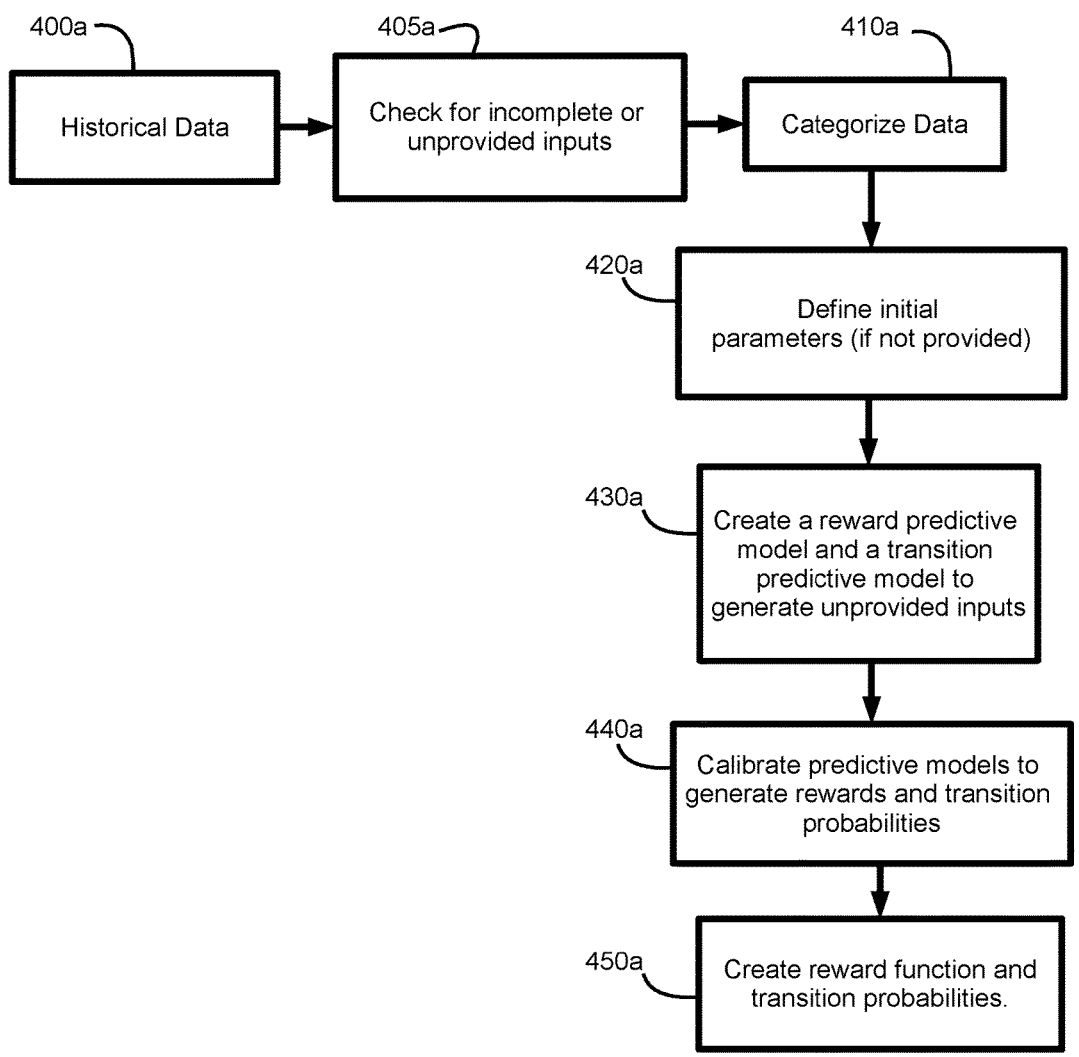
FIG. 4a is a flow chart of an embodiment of the system and method for defining and calibrating the inputs to a decision problem from historical data where some partial inputs are provided by the user.

FIG. 4a is a flowchart showing the steps to take historical data and define and calibrate the inputs to a sequential decision problem where the user provides incomplete or partial inputs to the decision problem. More specifically, FIG. 4a is a breakdown of the steps involved in before block 460 in FIG. 4 is analogous to FIG. 2a. In step 400a the user inputs historical data and optionally further includes some states, actions or other information such as a few pre-identified states and transition probabilities. In step 405a the provided information is checked and incomplete or unprovided inputs are identified. Step 410a is analogous to step 210a, however since the user has provided some inputs the computer system accounts for the provided inputs when analyzing and categorizing the data. The additional provided information may be coded as a constraint (i.e. the computer system will not change it and will define and calibrate around the provided information) or the computer system may be allowed to change the provided information. Additionally the provided information may be given a weighting factor changing how the computer system statistically views the provided information. For example, a prior state and reward may be given a high weight making the computer system statistically view it as nearly a constraint. Steps 420a, 430a, 440a and 450a are otherwise analogous to FIG. 2a.

FIG. 5 provides a further example of how historical data is defined and calibrated to form inputs for a sequential decision problem. Block 500 shows some hypothetical historical data provided by a user with seven statistically identifiable subsets (A through G). For example several of the subsets could represent pricing data, while another could represent walk-in traffic changes and another represents profits.

Block 510 shows the historical data categorized and defined to form states and actions with irrelevant data discarded, not shown (perhaps provided by the user) is the time index or discount factor. Block 520 shows the predictive model being formed from the defined and categorized data. In block 520 the data has also been calibrated. Block 530 shows the transition probabilities and reward function being populated from the calibrated data. In this simplified example the reward function is viewed as several matrices, however in a more complicated setting it may not be possible to reduce it to a few simple matrices.

FIG. 6 shows a still further example of defining and calibrating inputs to a sequential decision problem from historical data for one state dimension. This state dimension could have been provided by the user, as in FIG. 3 or FIG. 4, or defined by the computer system as in FIG. 2. In FIG. 6 we see how the graph of this simplified state dimension is calibrated and binned into five discrete elements to capture the essence of the data while allowing efficient computational solution techniques to be used to solve a sequential decision problem that this data forms a part of.

Figure 7:
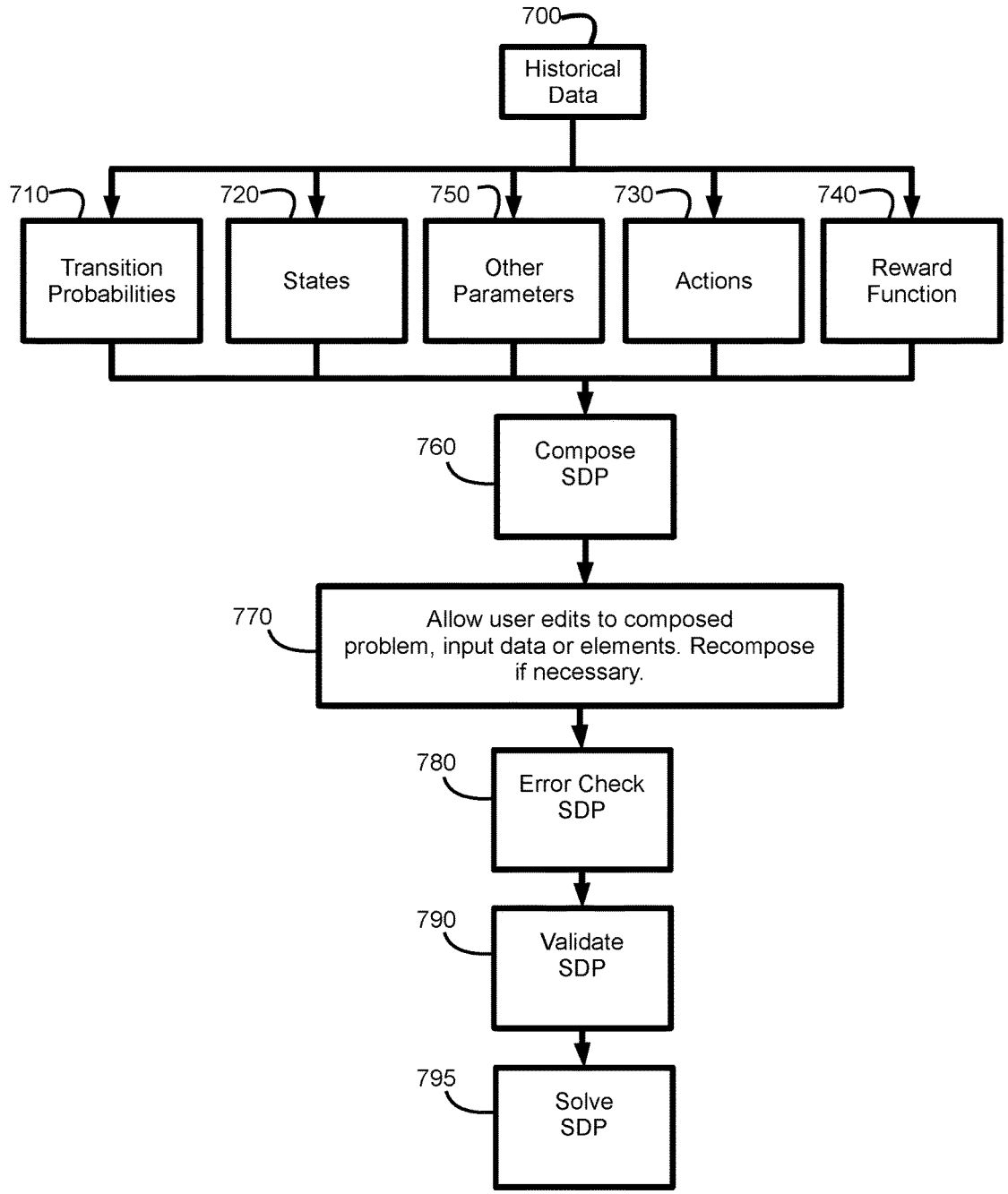
FIG. 7 is a block diagram of an embodiment where the user provides historical data and is prompted to provide edits.

FIG. 7 shows a different embodiment generally analogous to FIG. 2 and FIG. 2a, however FIG. 7 has an additional element which could be located before or during definition, calibration, composition or in several locations where the user is prompted to edit the problem as it exists at that time. For example (as shown in FIG. 7) the user is prompted to edit the composed decision problem after the decision problem is composed in block 760. However, the user could be prompted after error checking (block 780) and validation has (block 790) has occurred, or the user could be prompted after the data has been categorized during definition to ensure that the categorization makes sense to the user.

FIG. 7 allows the user to ensure that inputs to the sequential decision problem accurately reflect the conditions the user faces or do not implement actions, while possible, that the user is not comfortable with taking. For example, an action arrived at from the historical data could be to close and liquidate the user's business. This may be a rational choice, but the user could be sentimentally attached to a family owned business and is not willing to make the purely rational choice. In another example the user could edit the defined and calibrated states because some of them, while based upon reasonable analysis of the historical data, reflect one-time events unlikely to occur again. Furthermore the inputs to the sequential decision problem can be altered by the user to change the goal that the decision making advice helps the user to reach. Essentially, a user may disallow certain actions the user is not comfortable with making or choose to overweight some states that the user has a preference for. For example, a manager (upon reviewing the inputs or the decision making advice) realizes the optimal policy likely will require extensive layoffs. The manager can choose to alter the inputs, either by disallowing the action of layoffs, changing rewards associated with certain states or other alteration to decrease the likelihood of layoffs.

Figure 8:
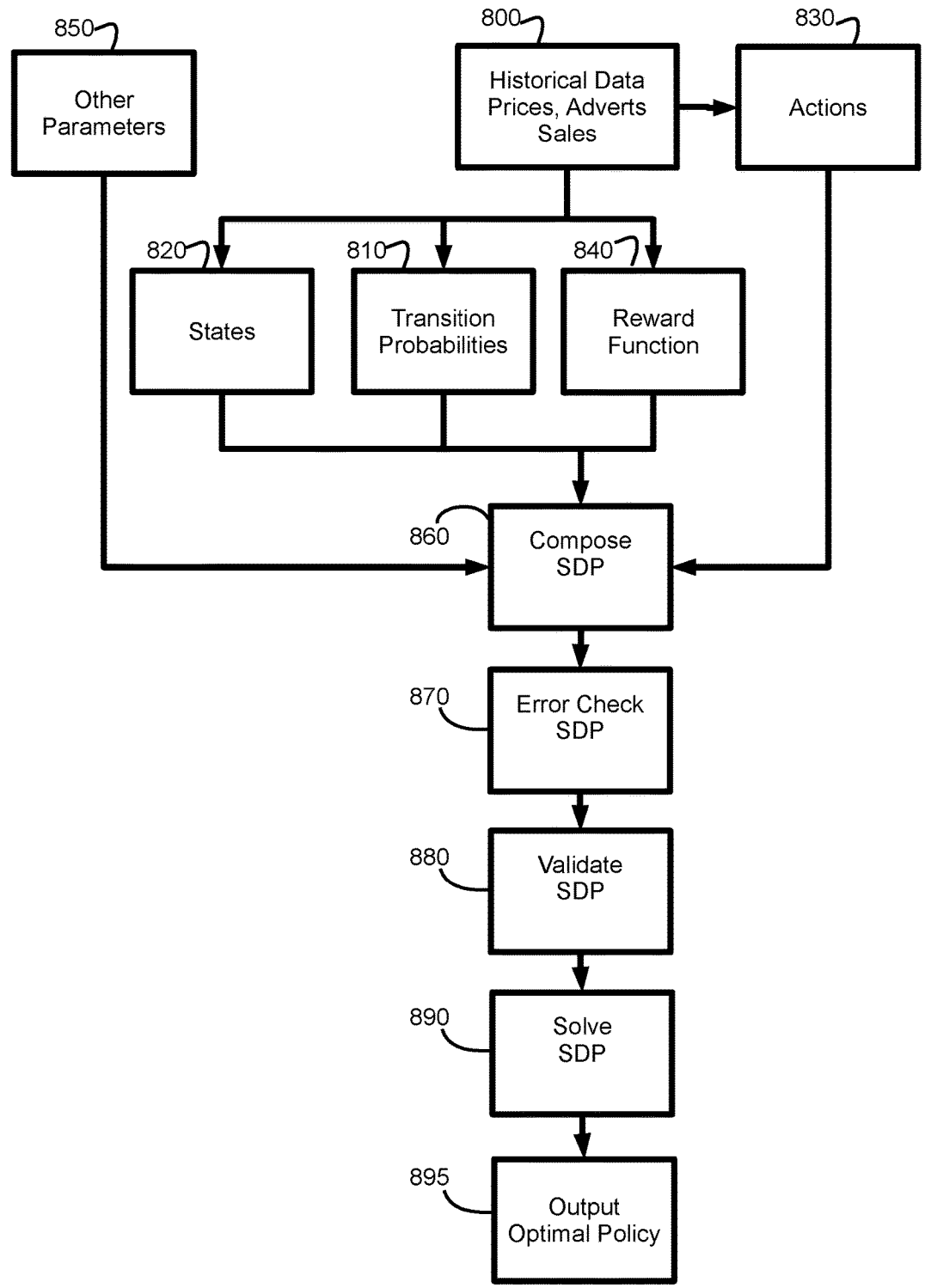
FIG. 8 is a block diagram of an embodiment where the user provides historical data, partial states, actions and other parameters receives decision making advice.

FIG. 8 shows an embodiment where a company hires a consultant to advise the company on optimal advertising strategies. The company provides historical data 800, actions 830 and other parameters 850 to the consultant. The consultant (generally as described above, specifically see FIG. 4 and FIG. 4a) defines and calibrates the inputs to a sequential decision problem using the historical data 800, actions 830 and other parameters 850 before composing 860, error checking 870, validating 880 solving 890 and outputting the optimal policy 895 as decision making advice.

In FIG. 8 the historical data 800 takes the form of prices, advertising data and levels and sales data. For example, the advertising data may include data about television ads such as length of ad, time of day the ad was aired, channel ad was aired on and number of times the ad was aired. The advertising data may further include other ad types such as weekly circulars (and data about the circulars) and radio ads.

The actions 830 represent the provided actions that the company is willing to take. For example the company may be willing to change advertising levels, change prices on some goods (such as store brand goods) but not change prices on other goods.

The other parameters 850 include a time index and a discount factor. In this example the time index may be complicated or represent a composition of functions representing that some actions can be performed on a hourly basis, such as television advertising, while others such as local newspaper ads may be on a weekly basis. In this example the discount factor could be high, showing a strong preference for immediate rewards representing that the company feels it must generate business or it could be low representing a company more willing to accept lower short term profits while attempting to grow the business.

The consultant takes the historical data 800, the actions 830 and using regression analysis and clustering defines and calibrates the states 820. The consultant calibrates the states 820 and the actions 830 to form state-action pairs, each state-action pair representing a subset of the regression variables. For example, the state is specified by the pricing data and the action is represented by the advertising actions. Additional joint characteristics of the state-action pair could be represented by further historical data 800 such as past advertising levels, however a state-action pair is not necessarily a combination of only two regression variables.

The consultant also defines and calibrates the transition probabilities 810 and the reward function 840 by defining the distribution of each variable as a mean $\mu$ (represented by each variable's regression coefficient) and a standard deviation $\sigma$ (represented by each variable's standard error). Then the consultant calibrates by projecting (perhaps with statistical smoothing techniques) the distribution of likely rewards associated with a state-action pair by combining the individual distributions of each regression variable associated with it. This total distribution for each state-action pair describes both the set of possible revenues (reward function 840) and the likelihood of collecting each revenue (transition probabilities 810).

In this example the transition probabilities 810 is a matrix with each row corresponding to a state-action pair. The entries in each row are calculated from the state-action pair's distribution, with columns representing future states. Within this distribution (with mean $\mu$ and standard deviation $\sigma$), there could be bins with boundaries defined at $\mu$ plus or minus a multiple of the standard deviation. Additionally, the reward function 840 associated with each bin could be defined as the revenue at that bin's midpoint, and the transition probability associated with each bin to be the cumulative probability of observing any value between the bin boundaries.

What is claimed is:

1. A computer-aided decision making system, comprising: a user input device; a user output device; and a processor programmed to evaluate decision problems available to a user, the programmed processor;
   (A) facilitating input of a historical data set from a decision maker via the user input device;
   (B) the programmed processor defining a decision problem to be solved, the decision problem defined by parameters generated using statistical techniques on the historical data set, the parameters including;
      (i) an action set, the action set has elements representing actions available to a subject and action costs to the subject of performing the actions,
      (ii) at least one state dimension representing conditions relevant to the subject of the decision problem,
      (iii) a reward set representing rewards received by the user when transitioning between states for actions in the action set,
      (iv) each state dimension having a corresponding transition matrix containing a probability of moving between the states for actions in the action set,
      (v) a time index and a discount factor, the time index containing decision points available to the subject where the subject selects an action from the action set, and the discount factor representing the subject's preference for rewards relative to time,
   (C) the programmed processor combining the reward set with the action costs to form a reward matrix and the programmed processor combining the transition matrices with the action set to form a total transition matrix;
   (D) the programmed processor forming a functional equation from the state dimensions, the reward matrix, the total transition matrix, and the time index and the discount factor;
   (E) the programmed processor evaluating the functional equation, including error-checking and validating the parameters and performing a convergence check to ensure that the functional equation will be solvable, and the programmed processor solving the functional equation;
   (F) the programmed processor generating an optimal policy by using the solved functional equation to find, for every point in the time index, an overall value-maximizing action;
   (G) the programmed processor outputting the optimal policy to the user through the user output device.

2. A computer-aided decision making system according to claim 1, wherein the programmed processor generates the at least one state dimension, the action costs, the time index and the discount factor using at least one of: K-means, K nearest neighbors, or hierarchical clustering, or Bayes or Naive-Bayes classification.

3. A computer-aided decision making system according to claim 1, wherein the programmed processor receives the historical data and, before defining the decision problem by generating the parameters, at least one additional input of: an action, a state, a discount factor, a decision point, a reward for the reward set, an element of the transition matrix, or an action cost, the programmed processor generating all of the parameters not received as additional input and including the additional input in the statistical techniques.

4. A computer-aided decision making system according to claim 1, wherein the programmed processor receives the historical data and the at least one state dimension, the action set, the action costs, the discount factor, the time index and the programmed processor uses the historical data to generate the reward set and the transition matrices.

5. A computer-aided decision making system according to claim 4, wherein the programmed processor uses the historical data to generate the parameters including modifying at least one of the at least one state dimension, the action set, the action costs, the discount factor or the time index.

6. A computer-aided decision making system according to claim 4, wherein the programmed processor receives the historical data and at least one reward for the reward set or one element of a transition matrix and uses the historical data and all of the elements not received as additional input and including the additional input in the statistical techniques to generate the reward set and the set of transition matrices.

7. A computer-aided decision making system according to claim 1, wherein the programmed processor prompts the user to review and edit at least one of the parameters of the decision problem generated from the historical data and forming the functional equation, the programmed processor allowing the user to re-review and re-edit at least one of the historical data or the parameters after forming the functional equation, re-forming the functional equation when an edit is made.

8. A computer-aided decision making system according to claim 4, wherein the programmed processor prompts the user to review and edit at least one of the parameters of the decision problem generated from the historical data and forming the functional equation, the programmed processor allowing the user to re-review and re-edit at least one of the historical data or the parameters after forming the functional equation, re-forming the functional equation when an edit is made.

9. A computer-aided decision making system according to claim 1, wherein the programmed processor prompts the user to review and edit at least one of the parameters of the decision problem generated from the historical data after viewing the optimal policy and the programmed processor reforming and solving the edited decision problem for the user.

10. A computer-aided decision making system according to claim 4, wherein the programmed processor prompts the user to review and edit at least one of the parameters of the decision problem generated from the historical data after viewing the optimal policy and the programmed processor reforming and solving the edited decision problem for the user.

11. A computer implemented method for assisting a user in making a decision comprising:
   providing a computer system having a user input device, a user output device and a processor programmed with instructions to evaluate decision problems available to the user, the instructions programming the processor and;
   (A) using the computer system to facilitate input of a historical data set from a decision maker via the user input device;
   (B) defining a decision problem to be solved, the decision problem defined by parameters generated using statistical techniques on the historical data set, the parameters including;
      (i) an action set, the action set has elements representing actions available to a subject and action costs to the subject of performing the actions,
      (ii) at least one state dimension representing conditions relevant to the subject of the decision problem, each state dimension has elements representing values of a condition relevant to the subject of the decision problem,
      (iii) a reward set representing rewards received by the user when transitioning between states for each action in the action set,
      (iv) each state dimension having a corresponding transition matrix containing a probability of moving between the states for actions in the action set,
      (v) a time index and a discount factor, the time index containing decision points available to the subject where the subject selects an action from the action set, and the discount factor representing the subject's preference for rewards relative to time,
   (C) combining the reward set with the action costs to form a reward matrix and combining the transition matrices with the action set to form a total transition matrix;
   (D) forming a functional equation from the state dimensions, the reward matrix, the total transition matrix, and the time index and the discount factor;
   (E) evaluating the functional equation, including error-checking and validating the parameters and performing a convergence check to ensure that the functional equation will be solvable, and the programmed processor solving the functional equation;
   (F) generating an optimal policy by using the solved functional equation to find, for every point in the time index, an overall value-maximizing action;
   (G) outputting the optimal policy to the user through the user output device.

12. A method as set forth in claim 11, wherein the step of generating the at least one state dimension, the action costs, the time index and the discount factor using at least one of: K-means, K nearest neighbors, or hierarchical clustering, or Bayes or Naive-Bayes classification.

13. A method as set forth in claim 11, wherein the step of receiving the historical data and, before defining the decision problem by generating the parameters, at least one additional input of: an action, a state, a discount factor, a decision point, a reward for the reward set, an element of the transition matrix, or an action cost, the programmed processor generating all of the parameters not received as additional input and including the additional input in the statistical techniques.

14. A method as set forth in claim 11, wherein the step of receiving the historical data also includes the at least one state dimension, the action set, the action costs, the discount factor, the time index and using the historical data to generate the reward set and the transition matrices.

15. A method as set forth in claim 14, wherein the step of using the historical data to generate the parameters further includes modifying at least one of the at least one state dimension, the action set, the action costs, the discount factor or the time index.

16. A method as set forth in claim 14, wherein the step of receiving the historical data further includes at least one reward for the reward set or one element of a transition matrix and using the historical data and all of the elements not received as additional input and including the additional input in the statistical techniques to generate the reward set and the set of transition matrices.

17. A method as set forth in claim 11, wherein an additional step prompts the user to review and edit at least one of the parameters of the decision problem generated from the historical data and forming the functional equation and further includes the step of allowing the user to re-review and re-edit at least one of the historical data or the parameters after forming the functional equation, re-forming the functional equation when an edit is made.

18. A method as set forth in claim 14 wherein an additional step prompts the user to review and edit at least one of the parameters of the decision problem generated from the historical data and forming the functional equation and further includes the step of allowing the user to re-review and re-edit at least one of the historical data or the parameters after forming the functional equation, re-forming the functional equation when an edit is made.

19. A method as set forth in claim 11 wherein an additional step prompts the user to review and edit at least one of the parameters of the decision problem generated from the historical data after viewing the optimal policy and reforming and solving the edited decision problem for the user.

20. A method as set forth in claim 14 wherein the programmed processor prompts the user to review and edit at least one of the parameters of the decision problem generated from the historical data after viewing the optimal policy and reforming and solving the edited decision problem for the user.

* * * * *